United States Patent [19]

Cho

[11] Patent Number: 4,642,747
[45] Date of Patent: Feb. 10, 1987

[54] FAULT-PROTECTION APPARATUS FOR STATIC AC-TO-AC CONVERTERS AND UNRESTRICTED FREQUENCY CHANGER (UFC) SYSTEM INCLUDING SUCH FAULT-PROTECTION APPARATUS

[75] Inventor: Gyu-Hyeong Cho, Seoul, Rep. of Korea

[73] Assignee: Westinghouse Electric Corp., Pittsburgh, Pa.

[21] Appl. No.: 736,897

[22] Filed: May 22, 1985

[51] Int. Cl.⁴ .......................................... H02H 7/125
[52] U.S. Cl. .................................... 363/54; 363/161; 361/58; 361/111
[58] Field of Search ...................... 363/50-51, 363/52-54, 160-161, 162; 361/58, 62-64, 111-112, 118, 126; 323/908, 910

[56] References Cited

U.S. PATENT DOCUMENTS

| | | |
|---|---|---|
| 3,047,746 | 7/1962 | Berkery .............................. 361/58 |
| 3,470,447 | 9/1969 | Gyugyi et al. ..................... 363/10 |
| 3,493,838 | 2/1970 | Gyugyi et al. ..................... 363/10 |
| 3,641,417 | 2/1972 | Gyugyi ............................. 363/160 X |
| 4,191,986 | 3/1980 | Huang et al. ..................... 323/908 |
| 4,328,454 | 5/1982 | Okuyama et al. ................. 363/37 X |
| 4,414,599 | 11/1983 | Kobayashi ....................... 363/54 X |

*Primary Examiner*—Peter S. Wong
*Attorney, Agent, or Firm*—C. M. Lorin

[57] ABSTRACT

Fault-protection is added to static AC-to-AC converter to protect the GTO devices bilaterally by adding at least two line bridges of diodes having an inductor thereacross. Fault-protection is extended to a UFC system by incorporating such inductor in the diode bridges of the GTO devices forming the bilateral switches of the UFC system. The dissipating energy is minimized by combining such fault-protection bridges. The inductors may be coupled controlled demagnetization of the inductors is provided.

10 Claims, 29 Drawing Figures

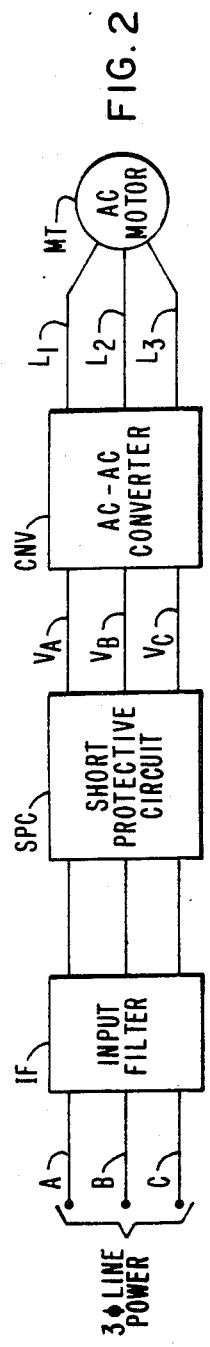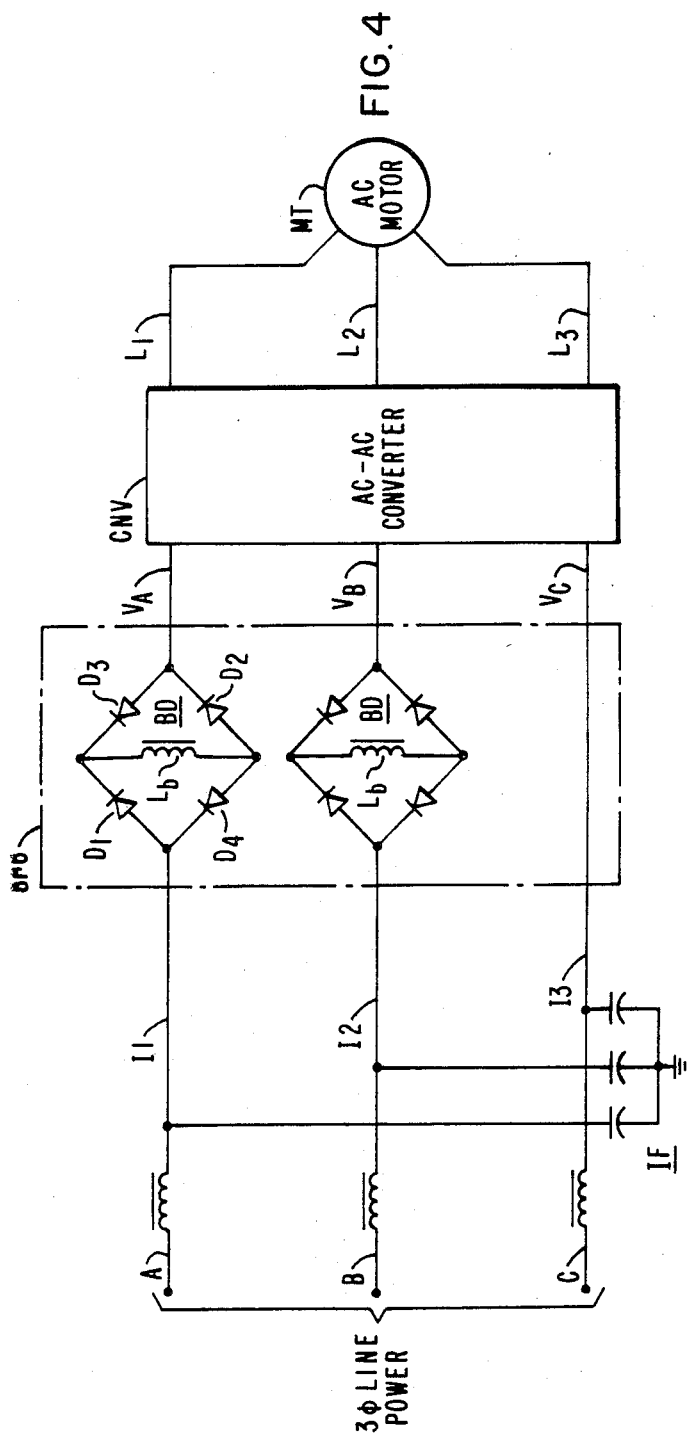

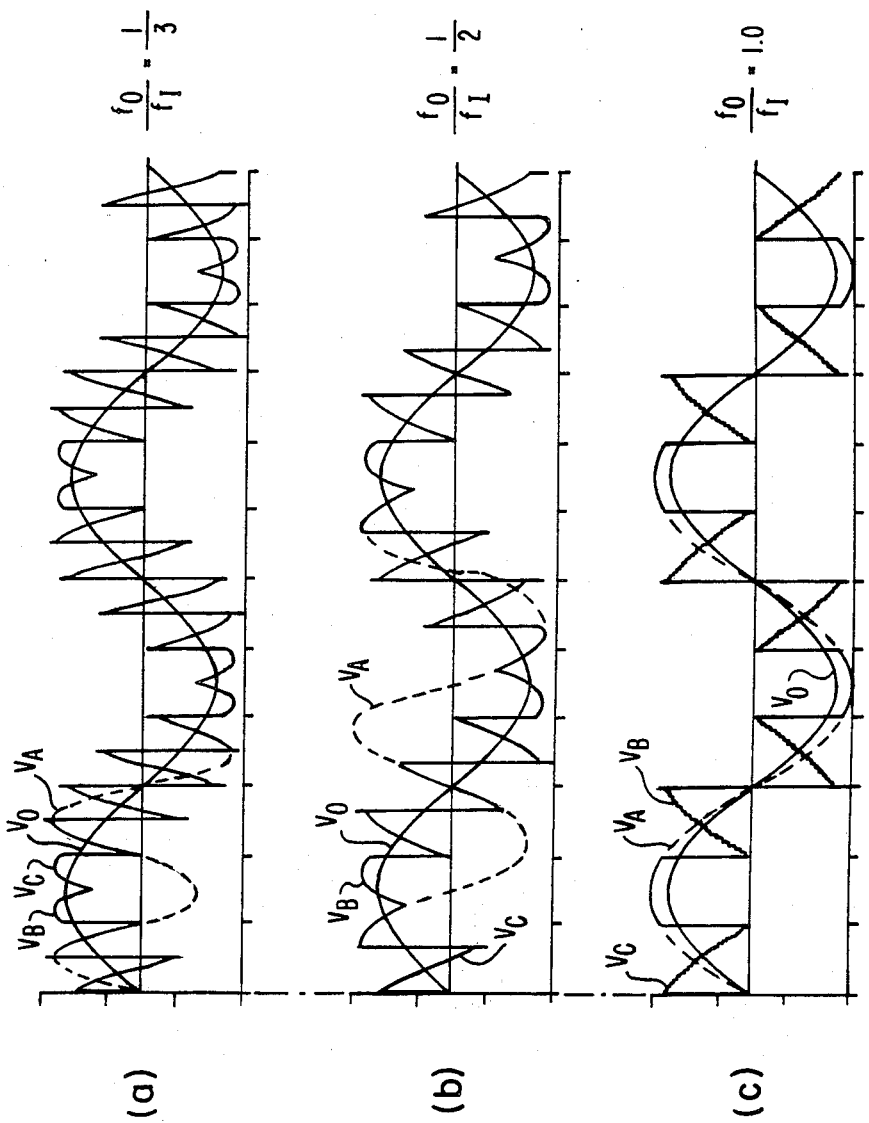

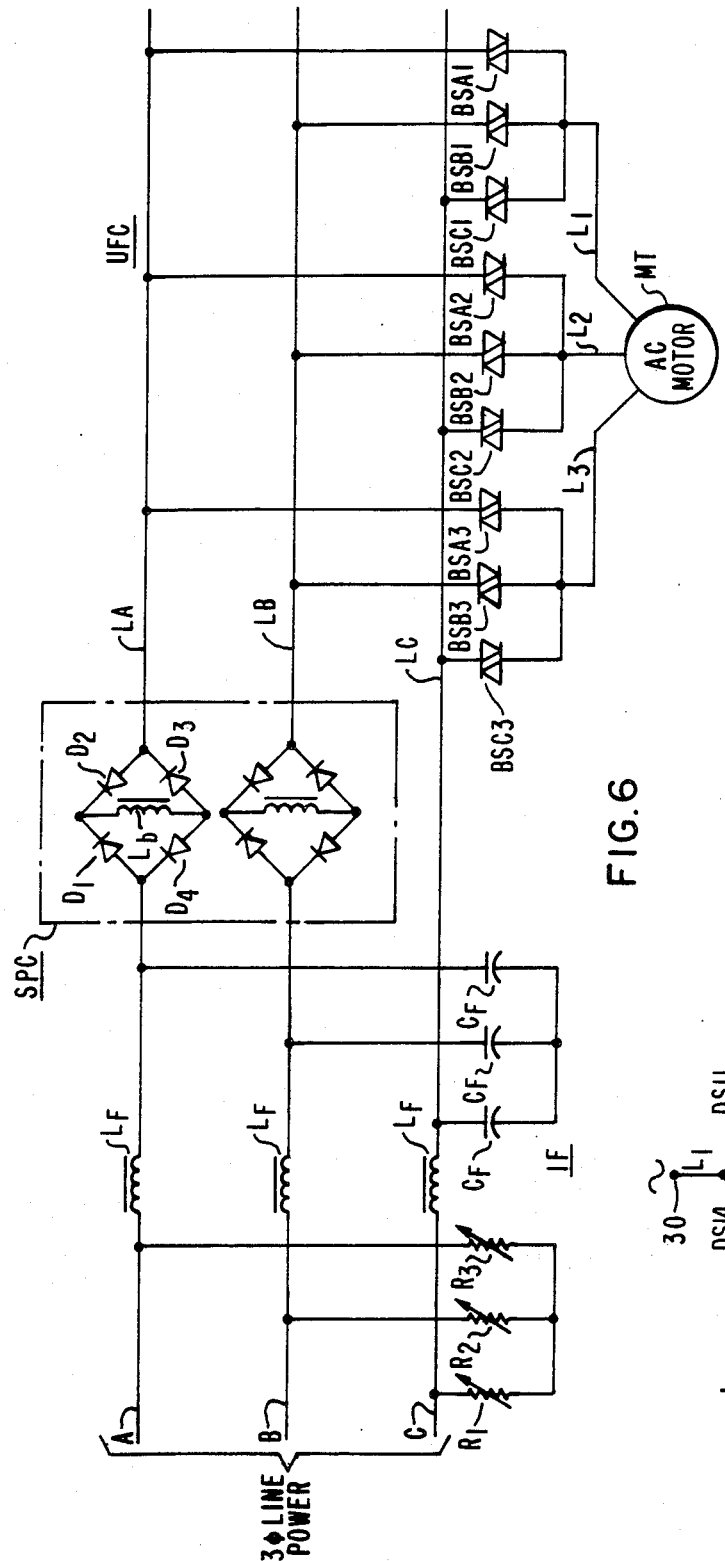
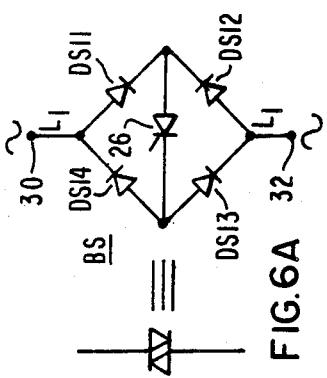
FIG. 6
FIG. 6A

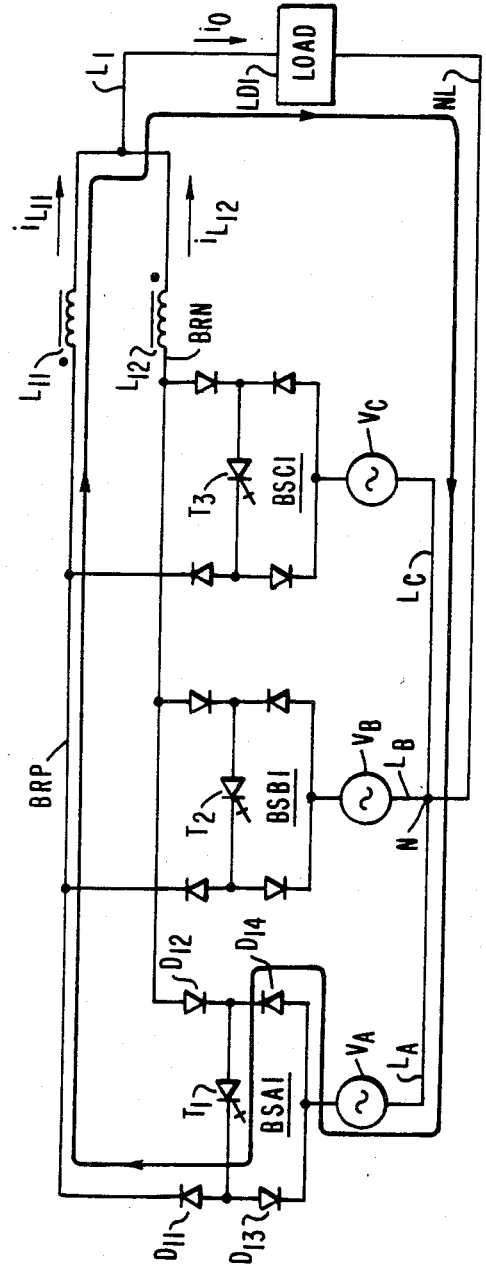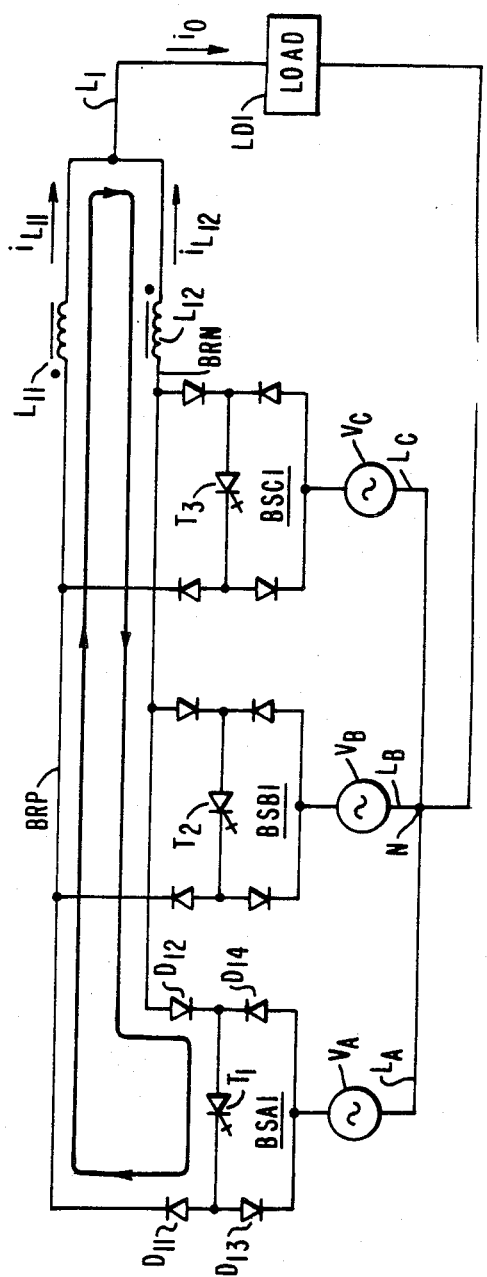
FIG.9A
FIG.9B

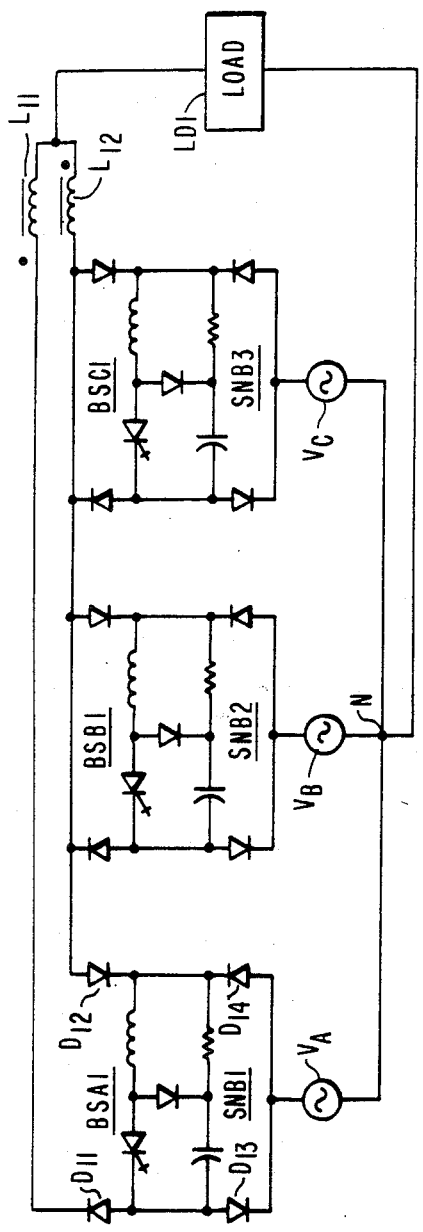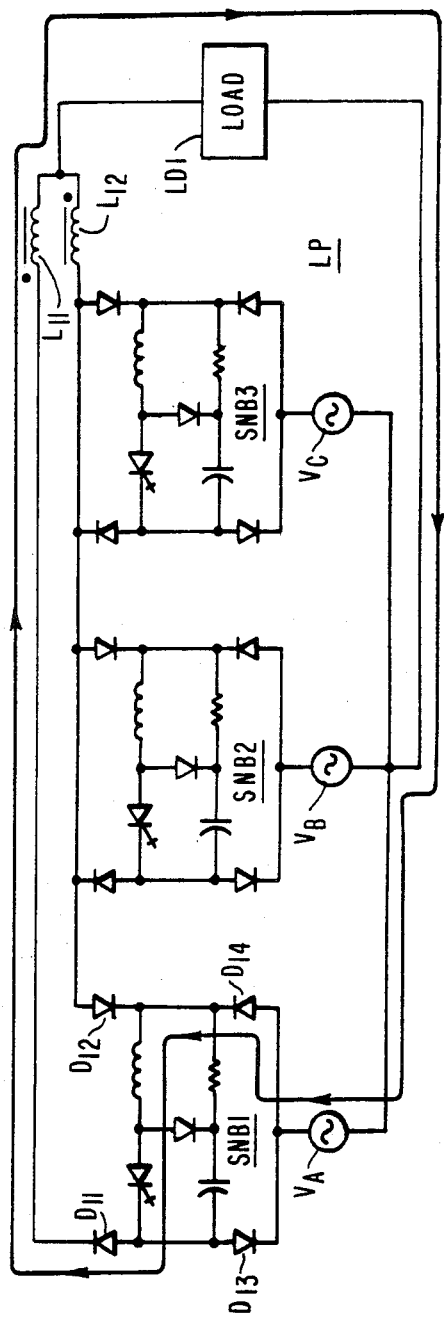

FAULT-PROTECTION APPARATUS FOR STATIC AC-TO-AC CONVERTERS AND UNRESTRICTED FREQUENCY CHANGER (UFC) SYSTEM INCLUDING SUCH FAULT-PROTECTION APPARATUS

The invention relates to fault-protection against the occurrence of a short in power supply lines, in general, and more particularly to protection of the power switches of a static AC-to-AC converter against a short in the AC lines on either side thereof. More specifically, the invention applies to AC motor drives wherein the AC/AC converter is an Unrestricted Frequency Charger (UFC) used for providing variable-frequency variable-voltage output power to an AC motor and supplied from input AC network lines.

Still more specifically, the invention applies to a system including a frequency converter such as shown in U.S. Pat. Nos. 3,470,447 and 3,493,838. For the purpose of this disclosure, these two U.S. patents are hereby incorporated by reference.

The object of the present invention is to provide fuseless fault protection of a direct frequency power controller of the UFC type. In this kind of AC/AC converter, commutation is performed by forced-commutation. Therefore, self-extinguishable static switches are required. To this effect, use has been made recently of high current high voltage gate turn-off thyristor (GTO) devices. However, these devices are prone to be damaged by the high currents exceeding their ratings which would pass therethrough when a fault occurs at the output of the UFC.

As a protective measure, it is now proposed to provide a protective static circuit on the line which could carry the unwanted excessive current through the power switches. Such protective static circuit automatically will act to limit the current and hold it within the rated level, and introduce a sufficient delay before a dangerous shoot-through current can occur, thereby to enable to cut off the converter and protect the switches. It is known with a converter of the inverter type to provide in the DC-link thereof a parallel network combining a diode and an inductor such that, upon any anomalous and rapid rise of the DC current, the inductor becomes effective in absorbing the increased current, while introducing a time constant in the transient which is sufficient to allow a shutdown of the inverter before the power switches thereof can be damaged.

SUMMARY OF THE INVENTION

The present invention is applicable to an Unrestricted Frequency Changer (UFC) system connecting polyphase input voltage phase lines with polyphase output voltage phase lines, wherein on at least two associated said UFC phase lines respective individual protective AC bridges are inserted, each bridge including a diagonal inductor common to opposite parallel branches having serially connected diodes operable in relation to a corresponding voltage polarity, whereby the inductor provides protection for the power switches against a short between phase lines involving such associated said UFC phase line, while being inactive when the diodes are normally passing current for either polarity, respectively.

In the individual protective bridge according to the invention the maximum peak current due to the occurrence of such line-to-line short is trapped by the diagonal inductor while current freewheels in the ring-around diodes of the parallel branches. In accordance with another embodiment of the present invention, advantage is taken of the bilateral switches and associated diodes normally used in the UFC system for the respective phase lines, by inserting two inductors between the common output terminal and each of the diode branches relative to the same current polarity of the respective power switches of the UFC. As a result, the two inductors behave with the associated diodes, for respective directions of current flow, like the single inductor of the aforesaid individual protective bridge.

With the second embodiment of the invention the two inductors may be coupled or not coupled together. A third embodiment provides three inductors coupled together from phase to phase for each direction of current flow in a three-phase three phase balanced arrangement.

Additional embodiments provide a less costly protection while minimizing the losses through the inductor.

BRIEF DESCRIPTION OF THE DRAWINGS

FIG. 2 shows a short-circuit protective circuit according to the prior art inserted in the supply lines of the AC/AC converter of a UFC AC motor drive;

FIG. 3A shows curves representing the phase to neutral voltage waveforms for three different ratios between output and input frequency;

FIG. 4 shows the internal nature of the short-circuit protective circuit of FIG. 2;

FIG. 6 shows the protective circuit of FIG. 4 embodied in a 3-pulse UFC system;

FIG. 6A shows a bilateral switch of the GTO type as used in the UFC system of FIG. 3;

FIGS. 9A and 9B illustrate the operation of the protective circuit of FIG. 7 by schematically representing current flow in two modes, respectively;

FIG. 15 is the circuit of FIG. 13 amended as in FIG. 7 to include inductors according to the invention;

FIGS. 16A, 16B, 16C illustrate with current flow how the inductors according to the invention shown in FIG. 15 participate in the commutation process;

DESCRIPTION OF THE PREFERRED EMBODIMENT

The invention relates to fault protection against a direct short-circuit between the lines of a static converter circuit. Static converters use static power switches which upon the occurrence of a short will pass a fault current exceeding their rating. This is particularly true with AC to AC converters having GTO devices, e.g. devices which are "artificially" commutated. This is the situation in particular with the Unrestricted Frequency Changer (UFC) which is typified by the description in the two aforementioned incorporated by reference patents, namely U.S. Pat. Nos. 3,470,447 and 3,493,838. In this kind of AC/AC converter forced-commutation is used which requires self-extinguishable devices, such as the GTO's.

Methods of protecting switches against shorts on the output lines of an AC/AC converter are known in a situation where the AC/AC converter combines a rectifier and an inverter with a DC link.

Figure 1:
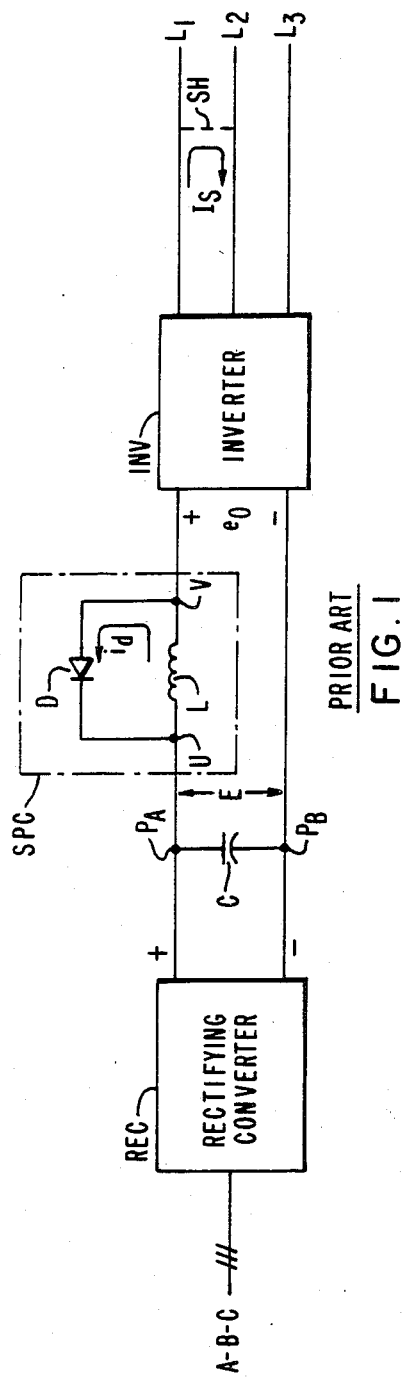
FIG. 1 is an inverter circuit embodying parallel inductor and diode protective circuitry of the prior art.

Referring to FIG. 1, the prior art parallel combination of a diode D and an inductor L is shown disposed in the DC link between the rectifying converter REC and the inverter INV of an AC-to-AC converter operating from input phases A, B, C into output lines $L_1$, $L_2$, $L_3$. Across the positive and negative terminals $P_A$, $P_B$ of the DC link on the REC side a capacitor C provides a DC source of voltage E, whereas, on the inverter side, the inverter is seen as a counter e.m.f. voltage source of voltage $e_0$. The problem is that, without some protective measure, upon the occurrence of a short SH (shown between lines $L_1$, $L_2$) the current rises so rapidly that there is no time to switch the inverter INV off, before the ON-going static switch is destroyed. The parallel combination (D, L) operates as a static protective circuit SPC against the occurrence of a short between the output lines, typically at SH between lines $L_1$ and $L_2$ as shown.

Figure 1A:
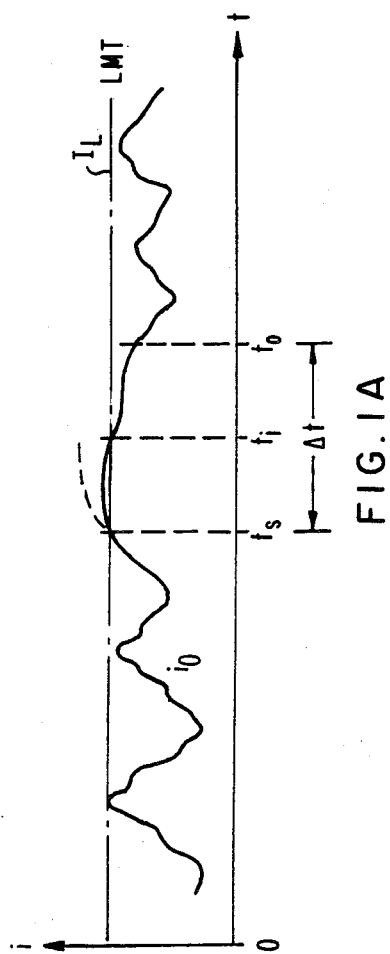
FIG. 1A is a curve illustrating the operation of the circuit of FIG. 1.

Normally an unidirectional current $i_0$ flows in the DC link, thus, before and after the protective circuit SPC, and unless current $i_0$ varies, no current circulates between diode and inductor in such protective circuit. The voltage drop across diode D typically is one volt, and the terminals U and V of the inductor L have the same voltage inbetween. Current $i_0$, though, varies in accordance with the load, as shown in FIG. 1A. As long as current $i_0$ remains below a limit LMT, changes in $i_0$ are translated into a voltage appearing between the ends U, V of inductor L. As a result, a circulating current $i_d$ establishes itself through diode D within the loop of the SPC circuit. A current $I_L$ flows in the inductor such that $I_L = i_0 + i_d$. Such current $I_L$ is determined by the potential difference between the potential E across capacitor C and the potential $e_0$ at the input of the inverter INV namely; $(E - e_0)$. The changes in $I_L$ are such that $$\frac{dI_L}{dt} = \frac{E - e_0}{L}.$$

Should, however, the current $i_0$ reach the limit LMT, or try to exceed such limit, then, current $i_d$ through the diode becomes zero. Diode D no longer short-circuits the inductor and the current gradient is as follows:

$$\frac{dI_L}{dt} = \frac{di_0}{dt} = \frac{E - e_0}{L}.$$

It is assumed now that there is a short SH as shown in FIG. 1. Then, $e_0 = 0$ and the maximum theoretical gradient that current $i_0$ can take through the protective circuit SPC and through the inverter INV, is $$\frac{dI_L}{dt} = \frac{di_0}{dt} = \frac{E}{L}.$$

As shown in FIG. 1A, from instant $t_s$ the rate of rise of current $i_0$ will be limited to the value E/L when the inverter is short-circuited. This allows enough time for the inverter to return to normal operation if the short was only temporary, or to cut-off the inverter altogether if the situation persists. The time delay allowed by such protective circuit SPC, typically, is 60 µs.

Referring to FIG. 2, the static protection circuit SPC is shown inserted between the AC input lines and the inputs of an AC/AC converter CNV of the UFC type, supplying its AC output to a load, typically, an AC motor MT. Converter CNV is of the type disclosed in the aforementioned two U.S. patents.

Referring to FIG. 3A, it is assumed that, in contrast to the three-phase bridge illustrated in FIG. 3 of either of the said patents, a three-pulse UFC system is used. Thus, there are three bilateral switches per input phase, rather than six. FIG. 3A shows the voltages $V_{AB}$, $V_{BC}$, $V_{CA}$, which are the line-to-line voltages at the input. Curve (a) shows the voltage derived through the successive voltages on one output phase as a result of the firing sequence of the various bilateral switches. The output voltage is depicted as a sinusoid $V_0$. The frequency $f_I$ of the input voltages is assumed to be three times the frequency $f_0$ at the output. Curve (b) shows the voltages when $f_0/f_I = \frac{1}{2}$, and curve (c) corresponds to a ratio of $f_0/f_I = 1.0$.

Figure 3B:
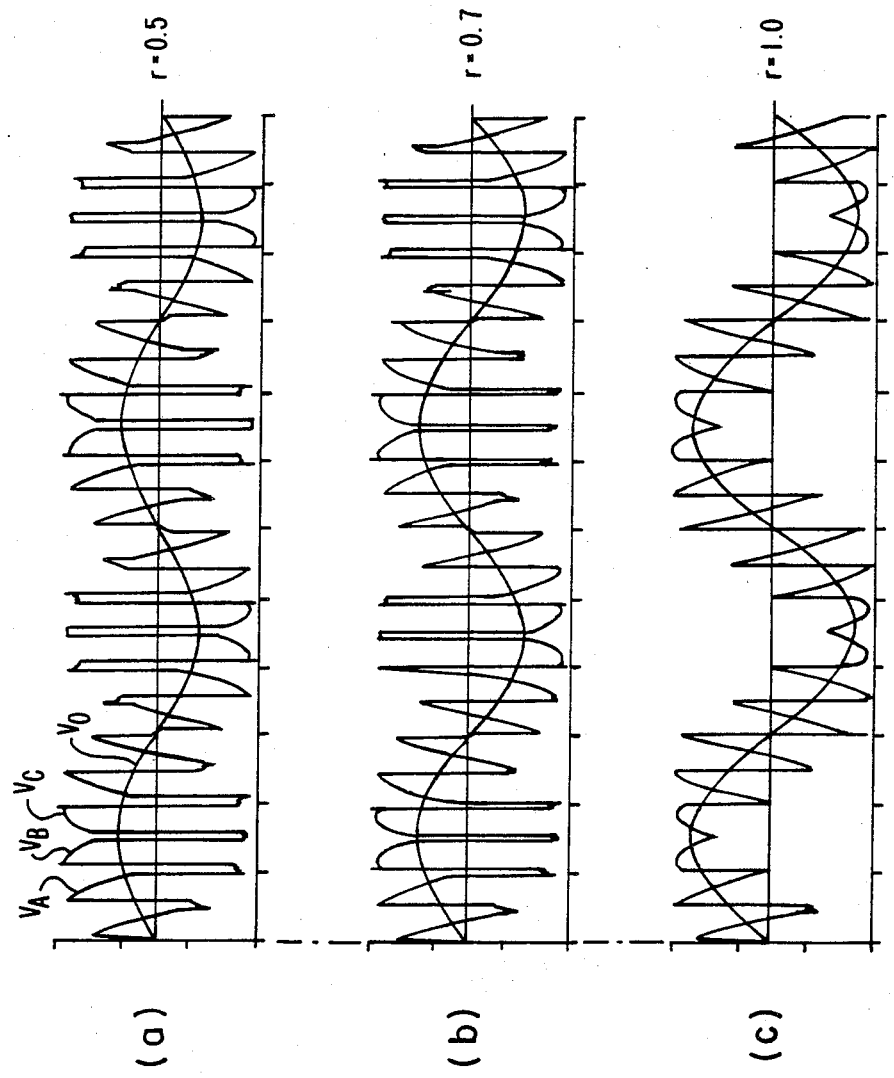
FIG. 3B shows in the situation of the first curve of FIG. 3A (output frequency-to-input frequency ratio o=⅓) with output control for three different ratios.

Referring to FIG. 3B, curve (c) is the same as curve (a) of FIG. 3A. Curve (a) corresponds to a time modulation of the switches such that a ratio $r = 0.5$ is obtained, while curve (b) illustrates the operation with $r = 0.7$. Indeed, curve (a) supposes $r = 1.0$. the magnitude of the output $V_0$ is accordingly increased from curve (a) to curve (c).

Referring again to FIG. 2, an input filter IF is interposed between the three lines ABC of the power supply and the static protection circuit SPC, for protection against undesirable harmonic disturbance.

Figure 5A:
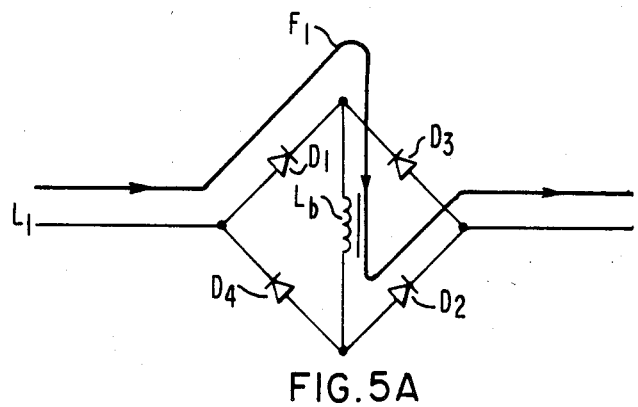
FIGS. 5A, 5B and 5C illustrate the operation of a bridge circuit such as shown in FIG. 4, by schematically representing current flow in three modes, respectively.
Figure 5B:
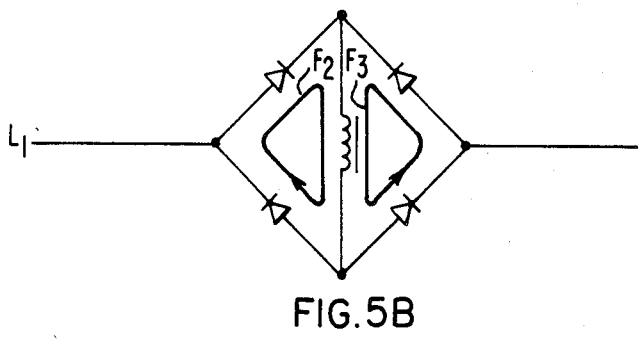
Figure 5C:
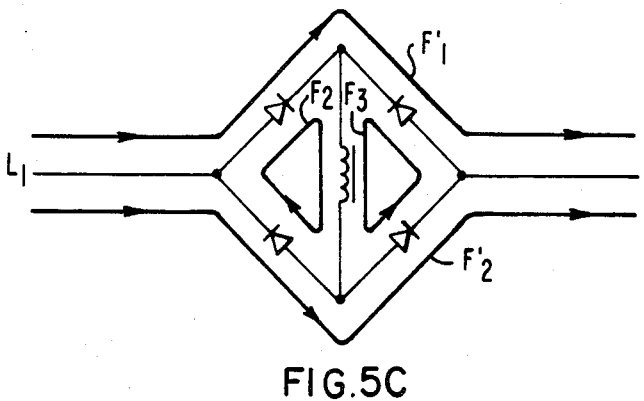

Referring to FIG. 4, the three sections IF, SPC and CNV are shown again, but sections IF and SPC are given here with more details. For currents $i_1$, $i_2$, $i_3$ passing on phases A, B and C, respectively, the line-to-neutral voltages are $V_A$, $V_B$, $V_C$. The fundamental is $V_o$. A static protection circuit SPC of the prior art comprises two bridges BD mounted independently from the converter INV on two selected lines thereof, typically on lines A and B. Each bridge BD includes an inductor $L_b$ on the diagonal and four diodes in the four respective branches, oriented so that opposite branches allow current flow through the inductor when line current is in a corresponding direction, $D_1$, $D_2$ for one direction of current flow, $D_3$, $D_4$ for the other direction. In contrast with the protective circuit of FIG. 1, the protective circuit according to this embodiment of the present invention, is bilateral. The operation of the bridges BD will now be explained by reference to FIGS. 5A, 5B and 5C which relate to three possible modes of operation, modes #1, #2 an #3, respectively. Considering phase A and line L input current, on both sides from the bridge, outside nodal points U and V, is $i_1$. It is assumed that the AC current has such polarity that $i_1$ flows from the left to the right. When all the current passes through the inductor $L_b$ with no circulating current through the parallel branches, current flow is as shown by mode #1 (FIG. 5A) with $i_1 = i_{Lb}$. When there is a circulating current ($i_{d2}$, $i_{d3}$) through the parallel branches, then, $i_{Lb} \geq i_1$. Such circulating currents, however, are as shown by loops $F_2$, $F_3$ in modes #2 and #3 of FIGS. 5B and 5C, respectively. Mode #2 (FIG. 5B) corresponds to a limit situation, namely when $i_1 = 0$, no current flows to or beyond the nodal points U and V, a situation which is characteristic of the AC current crossover. It is recalled, by reference to FIG. 1, that when current $i_0$ exceeds the limit shown in FIG. 1A, a circulating current takes place between inductor L and diode D, thereby absorbing the undesired peak value and introducing a favorable time constant. There too, but according to its proper and unusual characteristics, the bridge traps the peak value of the input current (during mode #1) and maintains the peak current nearly constant by the freewheeling operation ($F_2$, $F_3$) of the bridge BD (during modes #2, #3). Mode #3 corresponds to the entire period of the input frequency (modes #1 and #2 being only the limit cases), whereby the static protection circuit SPC behaves like an internal short circuit, e.g. like an unopened fuse, preserving the power connection to the AC/AC converter CNV. In mode #3, the line current flows through the conducting diodes which are circulating inductor current, namely ($D_1$, $D_3$), and ($D_4$, $D_2$) by-passing the diagonal branch. This type of protection is most advantageous for a UFC system which employs GTO's, as can be seen from FIG. 6 representing a three-pulse UFC, for the purpose of illustration.

FIG. 6 generally is identical to FIG. 4. Associated with each winding of the AC motor MT are three bilateral switches corresponding to the respective phases of the input lines A, B, C. Bilateral switches BSA1, BSB1, BSC1 relate to winding $W_1$, BSA2, BSB2, BSC2 to winding $W_2$ and BSA3, BSB3, BSC3 to winding $W_3$ of the motor. FIG. 6A shows one of these bilateral switches as composed of four diodes in a bridge (DS11, DS12, DS13, DS14) having a GTO device 26 in the bridge diagonal. Using the same numeral reference 26 for the GTO device, the AC line comes from an input 30 (on line LA, LB or LC in FIG. 6) and goes to an output 32 (into the motor winding end of motor MT in FIG. 6).

It is a known fact that the GTO has a maximum value of controllable ON-state current ($I_{TCM}$). In this kind of AC/AC converter, it is important to limit the current on each GTO to less than the limit $I_{TCM}$ for safety of operation, under any condition, including the possibility of a short-circuit. Whenever a short-circuit occurs, an abrupt change will take place from mode #3 to mode #1. When in mode #1, the worst that can happen is that the voltage across the inductor $L_b$ becomes the same as the peak value of the line-to-line voltage at the input side of the system (as explained by reference to FIG. 1 $e_0 = 0$ and E becomes the voltage between U and V during a short-circuit). Therefore, in order to prevent a rapid increase in the current, the value of the inductance will be chosen to be relatively high, since this value is a function of the rate of rise of the current, and the maximum such rate has to be anticipated. This value must correspond to the limit ITCM characteristic of the ON-state current of the GTO. Protection against the short is provided by turning the ON-going GTO's OFF when the current reaches the limit value of the controllable current. To this effect a current detector is provided which generates a triggering pulse when a critical event occurs, and such triggering pulse is applied to the CNV control immediately shutting down the converter CNV.

Figure 7:
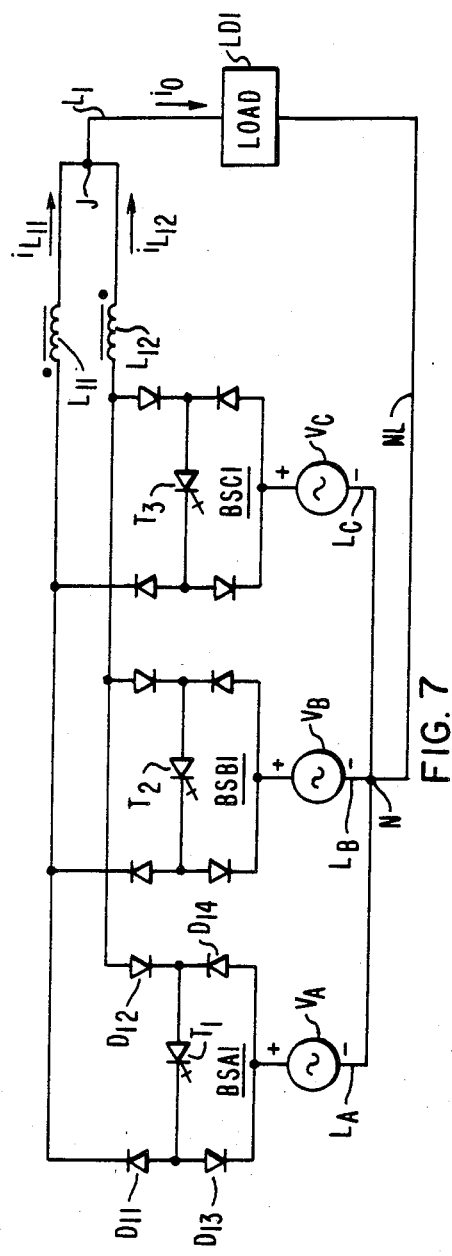
FIG. 7 shows the protective circuit according to the invention in which three GTO bilateral switches like in FIG. 6A are combined with protective circuits such as in FIG. 4 and which incorporate a free wheel pair of induction to form an overall protective circuit for the UFC system.

Referring to FIG. 7, the static protection circuit SPC according to the present invention is shown improved by using the diodes associated with the GTO device of the bilateral switch as part of the bridge of the SPC circuit, or conversely using the protective bridge of the SPC circuit as part of the bilateral switch to be protected. Two inductors $L_{11}$, $L_{12}$ are now associated with diodes of the ON bilateral switch, one working (for one direction of current flow) with the line current in mode #1; both of them working with the diodes under circulating current in mode #3 (as shown by FIGS. 9A and 9B) with the ON GTO device of UFC system. FIG. 7 illustrates these bilateral switches BSA1, BSB1, BSC1 associated with winding #1, or load LD1. The three input lines $L_A$, $L_B$, $L_C$ from the respective bilateral switches go to the voltage sources $V_A$, $V_B$, $V_C$, having their opposite pole to neutral N, itself connected to the neutral connection of the windings (or loads). Consideration should be given to the risk of destruction for the GTO in the UFC under overcurrent. All semiconductor devices, including GTO's are mainly destroyed by the hot spots formed within the junction thereof under critical external conditions such as high di/dt, excessive surge current, second breakdown, etc . . . . Such destruction is almost instantaneous. In the instance of the UFC, the main reason of damage to the GTO's is the instantaneous excessive current supplied by the filter capacitors $C_F$ of the filter INF when a short circuit occurs. This is due to the di/dt and di/dt rated limits assigned individually to the GTO's. The main energy causing the destruction of the GTO results from the maximum energy stored in the filter capacitors $C_F$ which is proportional to the square of the peak input voltage. The maximum controllable ON-state current is limited to a specified value $I_{TCM}$. The GTO will conduct values of current above $I_{TCM}$ but the GTO must not attempt to interrupt these higher values. Therefore, the objective of the protective circuit according to the invention is to force the GTO's to turn-OFF before the $I_{TCM}$ values has been reached.

Figure 8:
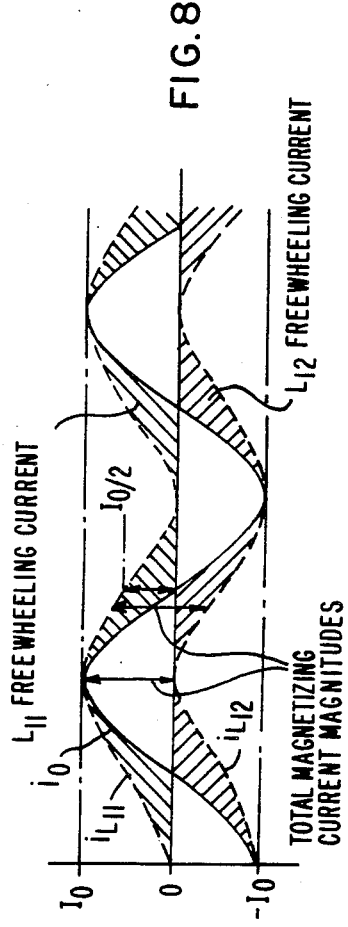
FIG. 8 provides curves illustrating the operation of the circuit of FIG. 7.

Referring to FIG. 8, in the light of FIG. 7 and of the two operative modes (mode #1 of FIG. 9A, mode #2 of FIG. 9B) the currents flowing through the inductors $i_{L11}$, $i_{L12}$ are shown in dotted line. The output current $i_0$ of line $L_1$ is shown in solid line, with a maximum $+I_0$, or a minimum $-I_0$. The shaded areas illustrate the zone where there is freewheeling by circulating current such as shown in FIG. 9B (mode #2). The magnetizing current ($i_{L11}$) of inductor $L_{11}$ would vary in a range between zero and $I_0$, while for $i_{L12}$ relative to inductor $L_{12}$, the range would be from zero to $-I_0$. The sum of the two magnetizing currents $(i_{L11}+i_{L12})$ is constant and equal to $I_0$ throughout the period of current $i_0$ on line $L_1$. Therefore the shaded area represents the difference between $i_{L11}$ or $i_{L12}$ and $i_0$, which is the excess of magnetizing current freewheeling through the GTO switch ($T_1$ in FIG. 7). The maximum freewheeling current magnitude is $I_0/2$, whereas in the instance of FIG. 4, such freewheeling current would reach $I_0$. Instead of having the maximum peak current trapped by the inductor L of FIG. 4, and freewheeling around the diodes while dissipating energy, the half of the peak current maximum is involved. It also follows that, by combining the SPC circuit with the bilateral switch BS, diodes are eliminated (eight in this case) and the GTO's $T_1$, $T_2$, $T_3$ are connected for bilateral operation between the phase voltage source ($V_A$ for phase A, $V_B$ for phase B, or $V_C$ for phase C) which has its other pole at neutral (N) and the input of the load (load LD1 or a winding $W_1$ in FIG. 8). On either side of the GTO are respective pairs of diodes ($D_{11}$, $D_{14}$) and ($D_{12}$, $D_{13}$) for the respective current directions. Diodes $D_{13}$ and $D_{14}$ (for the opposite directions of current flow) are connected jointly to the voltage source pole ($V_A$, $V_B$ or $V_C$). The other diodes of each pair ($D_{11}$, $D_{12}$) are connected to the input of the load (LD1, or a winding $W_1$) through corresponding inductors ($L_{11}$, $L_{12}$) having a common junction J with line L, to the load, or winding, of interest.

It is observed that the diodes of the bilateral switch BS fulfill the role of the diodes of the inductor bridge BD (FIG. 4) within the static protection bridge SPC, OFF-state detection circuits of the GTO's are no longer necessary. Moreover, besides lower losses by less circulating currents in the inductors, there is also lower voltage stress on the GTO due to the effect of the snubber capacitors and loop leakage inductances which are close by. This embodiment of the invention also provides protection against line-to-line shorts, as well as line-to-neutral shorts. It is worth mentioning, in addition, that there is an improvement in reliability.

Based on the illustrative embodiment shown in FIG. 7, the operation of the invention will now be described in a scope including improvements made and the range of applications.

It has been assumed in FIG. 7 that the two inductors ($L_{11}$, $L_{12}$) associated with one winding and three phase bilateral switches (BSA1, BSB1, BSC1) were uncoupled. In another embodiment of the invention they are coupled, and so for each pair of inductors such as $L_{11}$, $L_{12}$. In such case, the current waveforms will be the same as shown in FIG. 8, however, the equivalent inductive is changed; it becomes zero during the steady state operation. During the transient operation, the inductance value will be the same as in the uncoupled situation ($L_{11}/L_{12}$) but it becomes $L_{11}$ ($L_{12}$) for positive (negative transient load current.

Figure 10:
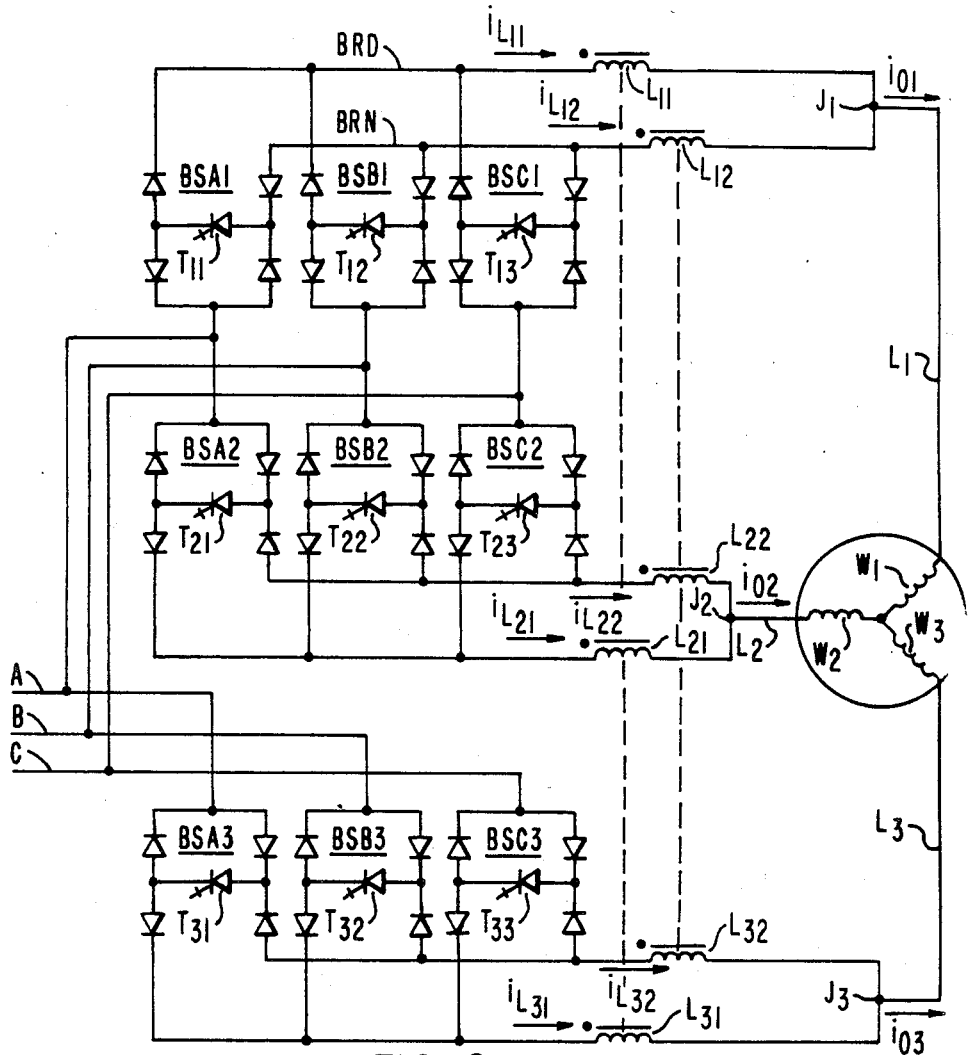
FIG. 10 is an arrangement where three protective circuits like in FIG. 6 are arranged in a balanced three-output and three-pulse UFC system.

Referring to FIG. 10, a system is shown of the line-pulse type with three balanced outputs from each pair of inductors, the three associated inductors ($L_{11}$, $L_{21}$, $L_{31}$), ($L_{12}$, $L_{22}$, $L_{32}$), i.e. those associated with the same electrode of a GTO, being coupled together. Thus, the bridges built about $T_{11}$, $T_{12}$ and $T_{13}$ correspond to $L_{11}$ and $L_{12}$, those built about $T_{21}$, $T_{22}$ and $T_{23}$ correspond to $L_{21}$ and $L_{22}$, and those built about $T_{31}$, $T_{32}$ and $T_{33}$ correspond to $L_{31}$, $L_{32}$; the inductors $L_{11}$, $L_{21}$ and $L_{31}$ being coupled together, and the inductors $L_{12}$, $L_{22}$ and $L_{32}$ being coupled together. By line $L_1$, winding $W_1$ of one star winding in the motor is connected to junction $J_1$ between $L_{11}$ and $L_{12}$; winding $W_2$ is connected to junction $J_2$ of $L_{21}$ and $L_{22}$; and winding $W_3$ is connected to junction $J_3$ of $L_{31}$ and $L_{32}$.

Figure 10A:
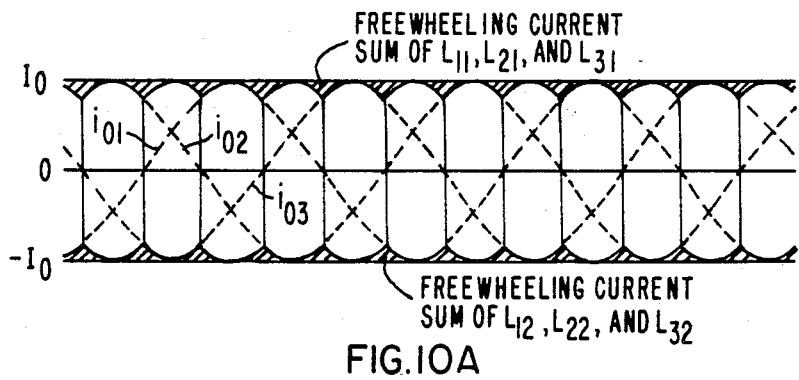
FIG. 10A shows with curves the effect on free wheeling current of the circuit of FIG. 10.

Ignoring the ripple component of the output current ($i_{01}$ for line $L_1$, $i_{02}$ for line $L_2$ and $i_{03}$ for line $L_3$) the current waveforms are like those shown in FIG. 10A.

Through the three inductors so coupled, there passes only positive, or negative currents. The circulating or freewheeling current has a maximum which is $I_o$ (positive or negative depending on the polarity). The shaded area between the $\pm I_o$ lines and the contour of the flowing currents $i_{01}$, $i_{02}$, $i_{03}$, represent the difference between the maximum magnetizing current and the sum of the load currents (positive, or negative) which is the freewheeling current through the switches (FIG. 9A). If $T_{11}$, $T_{22}$, $T_{33}$ are turned ON at a given instant, such freewheeling currents in the two sets of three-coupled inductors will flow through those switches. Hence, the freewheeling current flowing through one of these, for instance $T_{11}$, will only be one third of the shaded area current. This is a substantial improvement. Freewheeling current has been minimized. The impedances of the coupled inductors will only appear under transient conditions, like explained in the single output case of FIGS. 7 and 8. In FIG. 10, a filter IF like in FIGS. 2 and 4 is not shown, for the sake of simplicity in the drawings.

Figure 11:
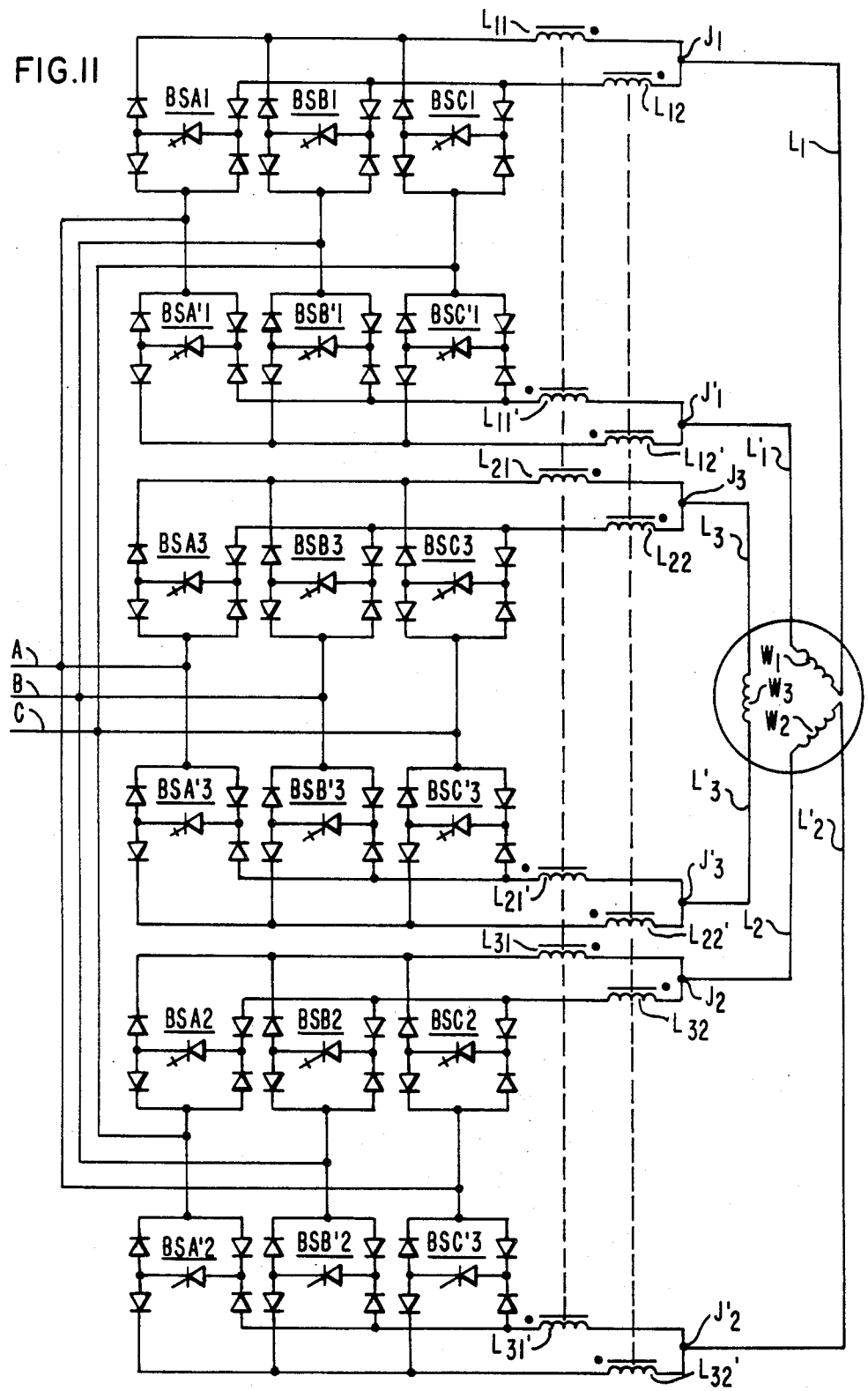
FIG. 11 is similar to FIG. 10 but where the system is a balanced three-output six-pulse scheme with the inductors coupled at the output side.

FIG. 11 is relative to a 3-output, 6-pulse system wherein two pairs of six coupled inductors are used, namely ($L_{11}$, $L_{11}'$, $L_{21}$, $L_{21}'$, $L_{31}$, $L_{31}'$) and ($L_{12}$, $L_{12}'$, $L_{22}$, $L_{22}'$, $L_{32}$, $L_{32}'$), with $L_{11}$ and $L_{12}$ being associated with line $L_1$ and one end of winding $W_1$, with $L_{11}'$ and $L_{12}'$ being associated with line $L_1'$ and the other end of winding $W_1$, and so on for the other windings ($W_2$, $W_3$), which in this case are connected in delta. The operation is similar to what has been described by reference to FIG. 10. The freewheeling current would also be negligible in this case.

Figure 12:
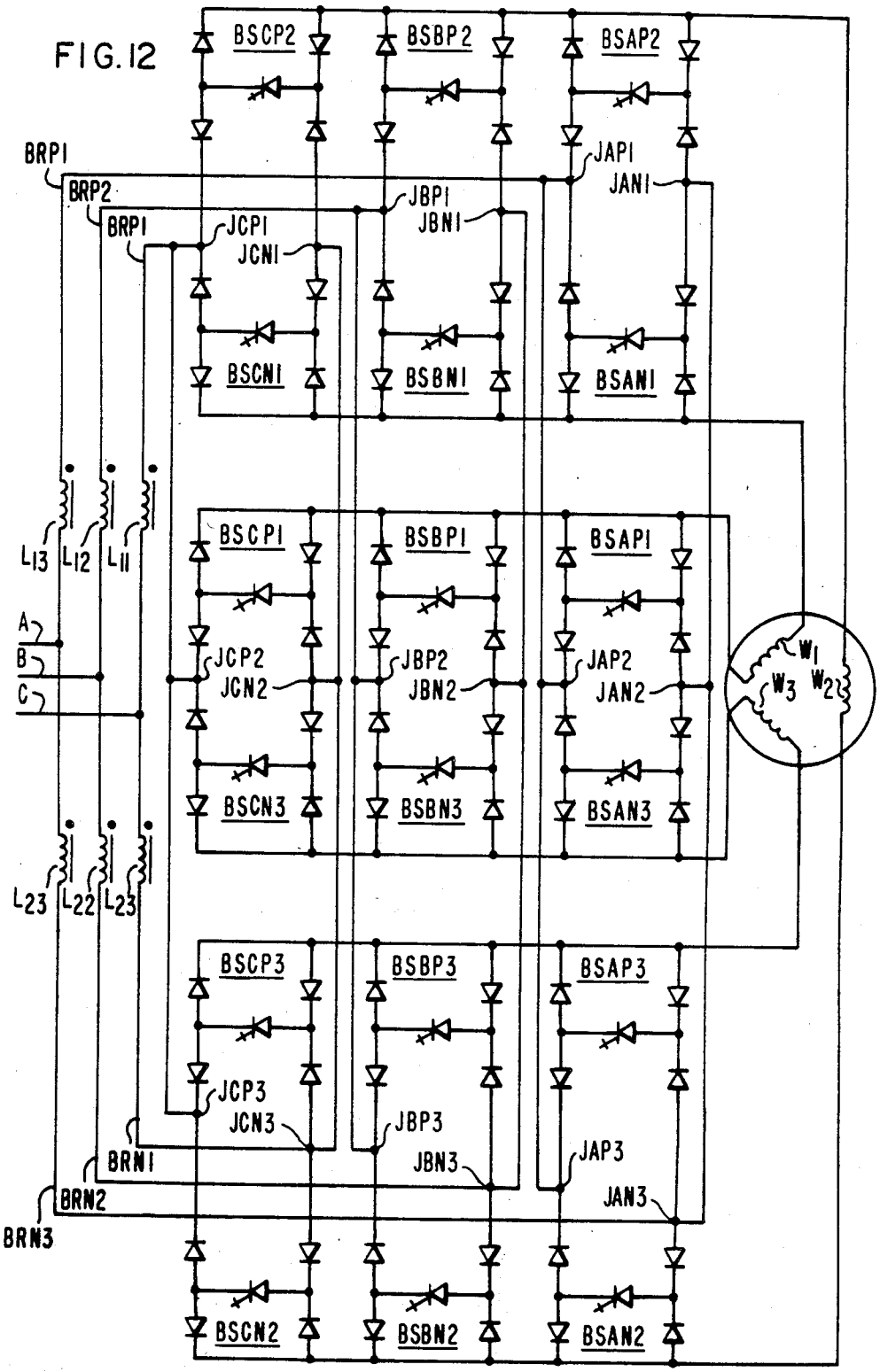
FIG. 12 is like in FIG. 11 but with the inductors coupled at the input side.

Referring to FIG. 12, the scheme differs from the scheme of FIG. 11 in that the inductors are inserted at the input side, rather than at the output side. As shown in FIG. 12, there are two inductors per input phase line ($L_{13}$, $L_{23}$ for phase A; $L_{12}$, $L_{22}$ for phase B; and $L_{11}$, $L_{21}$ for phase C). Across adjoining ends of two consecutive windings in the delta-connected motor, there are two bridges or bilateral switches per input phase: BSAP2, BSAN1 for windings $W_1$ and $W_2$, respectively and phase A; BSAP1, BSAN3 for phase A and windings $W_1$, $W_3$; BSAP3, BSAN2 for phase A and windings $W_3$, $W_2$. One inductor $L_{13}$ for phase A goes to one midpoint of such phase-associated pairs of bridges for the respective pairs of windings (JAP1 for $W_1$, $W_2$, JAP2 for $W_1$, $W_3$, JAP3 for $W_3$, $W_2$); whereas the other inductor $L_{23}$ for phase A goes to the opposite midpoint of such bridges (JAN1 for $W_1$, $W_2$, JAN2 for $W_1$, $W_3$, JAN3 for $W_3$, $W_2$). The same disposition is used for the other phase lines: $L_{12}$, $L_{22}$ for phase B, $L_{11}$, $L_{21}$ for phase C. The inductors $L_{13}$, $L_{12}$ and $L_{11}$ are coupled together, whereas the inductors $L_{23}$, $L_{22}$ and $L_{21}$ are coupled together. In this case only 6 elementary inductors, rather than the 12 needed in the case of FIG. 11, are necessary.

Having considered the magnetizing effect on the inductors of a sinusoidal load current, other magnetizing effects should be considered. Among other factors, there is the influence of the ripple current at the output side. Thus, considering the curves of FIG. 10A in the instance of a system like shown in FIG. 10, the maximum magnetizing current will be the sum of the current $I_o$ and the peak rippled current. Accordingly, the freewheeling current will be larger in magnitude than as shown in FIG. 10A. Still, such maximum magnetizing current will be limited, and it will not increase with time. Other factors to be considered are the diode recovery current, and the snubber capacitor charging current during the commutation interval, when there is use of a snubber circuit. Such snubber circuits are shown SNB1, SNB2 and SNB3, associated with the GTO bridge ($D_{11}$, $D_{12}$, $D_{13}$, $D_{14}$) of GTO devices $T_1$, $T_2$, $T_3$ in bilateral switches BSA1, BSB1 and BSC1 of the circuit of FIG. 13, which otherwise is like in FIG. 7 to include a pair of inductors $L_{11}$ and $L_{12}$. These two inductors $L_{11}$, $L_{12}$, for the sake of clarity, have not been shown in FIG. 13 in order to limit the explanations to the simple and direct connection situation in which such snubber circuits are usually found in a UFC system. The snubber circuit (SNB1, SNB2, or SNB2) includes an inductance L in series with the GTO, a series combination of a capacitor C and a resistance R mounted in parallel with the GTO and inductance L series network, and a diode across the nodal points of such two parallel series networks.

Figure 14A:
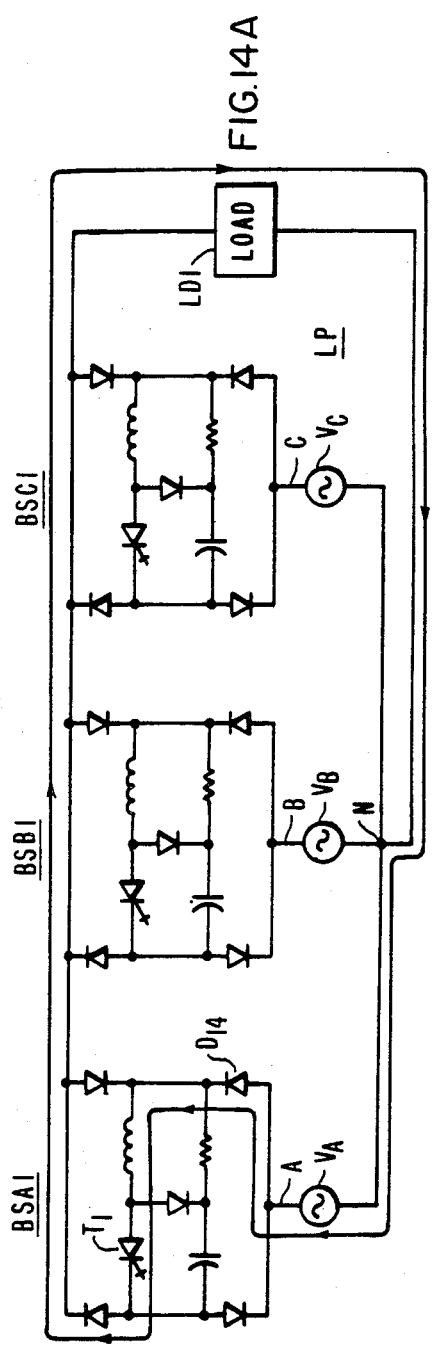
FIGS. 14A, 14B, 14C illustrate with current flow the commutation process in the circuit of FIG. 13.
Figure 14B:
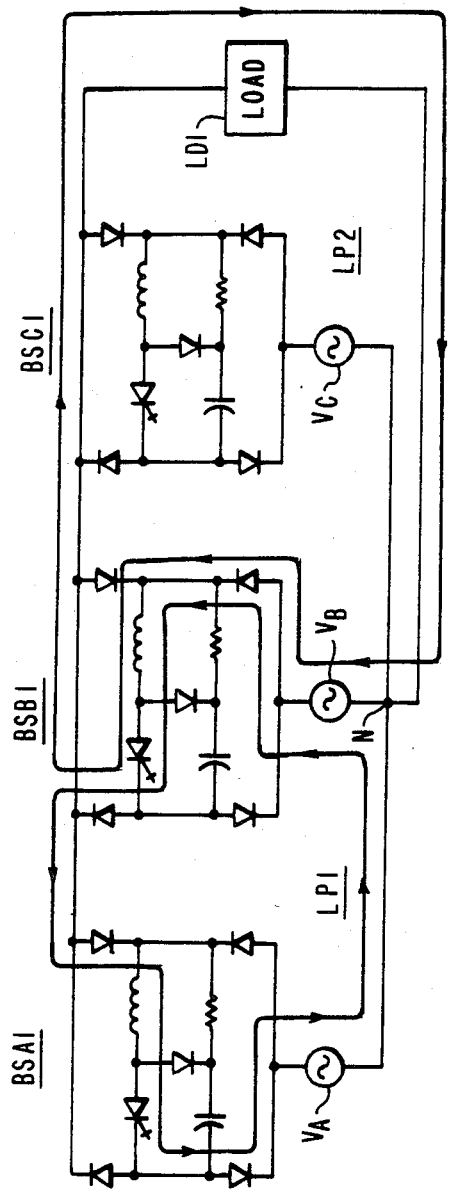
Figure 14C:
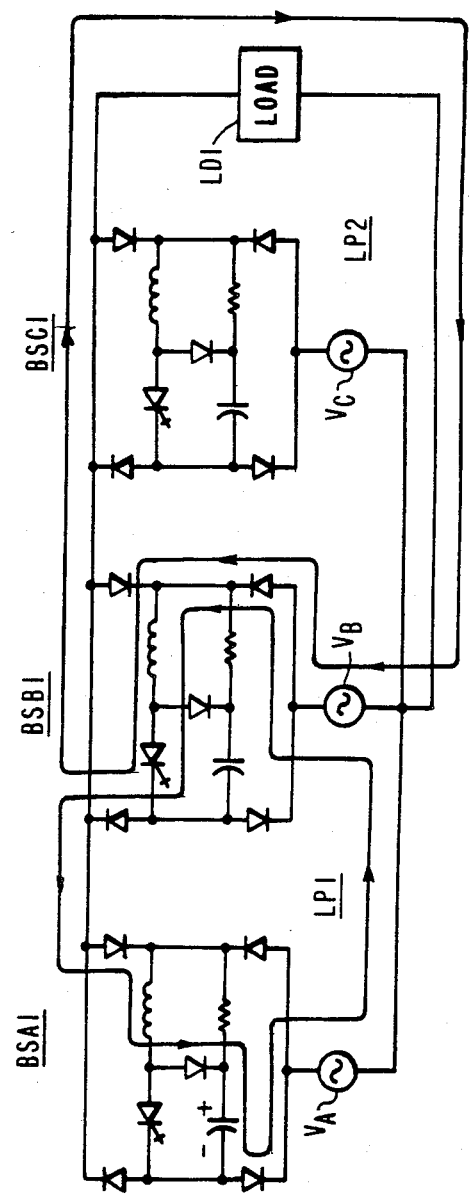

Referring to FIGS. 14A, 14B and 14C, the operation of the snubber circuit appears to be in three possible modes:

Normal operation is in mode #1 of FIG. 14A when current flows in a loop LP along phase line A through diodes $D_{11}$ and $D_{14}$ and across the GTO device. ($T_1$ in the illustrated case), over the load LD1. When the load is transferred from $T_1$ to $T_2$ in order to finally achieve a similar operation with $T_2$ through phase B and BSB1 to the load LD1, the intermediary stages are shown by mode #2 in FIG. 14B and mode #3 in FIG. 14C.

Mode #2 shows one loop LP1 with circulating current through the two concurrently conducting GTO's of the two successive bridges BSA1, BSB1 sequentially controlled when passing from phase A to phase B on the same load LD1. The load current in loop LP2 takes over through $D_{14}$ and $D_{11}$ of the oncoming bridge BSB1.

Mode #3 shows the situation derived from mode #2 when diode D assists in the turn-off of the GTO device of the out-going bridge (T1). In mode #3 the snubber capacitor C is charged through loop LP1 and is usually overcharged to a relatively large value owing to the leakage inductances of this loop which causes stress on the bilateral switch.

Figure 13:
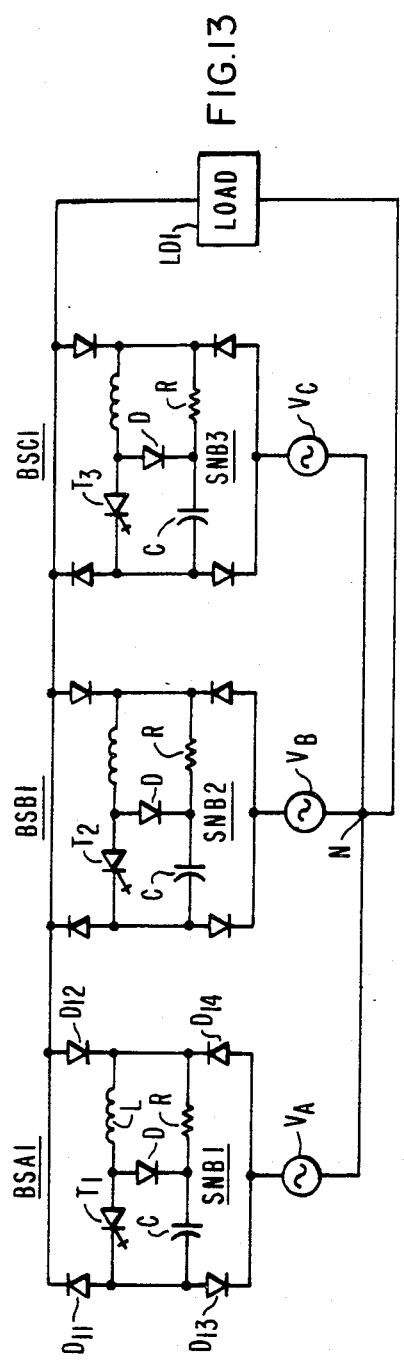
FIG. 13 illustrates schematically a UFC system of the prior art with a snubber circuitry as required for commutation.
Figure 16B:
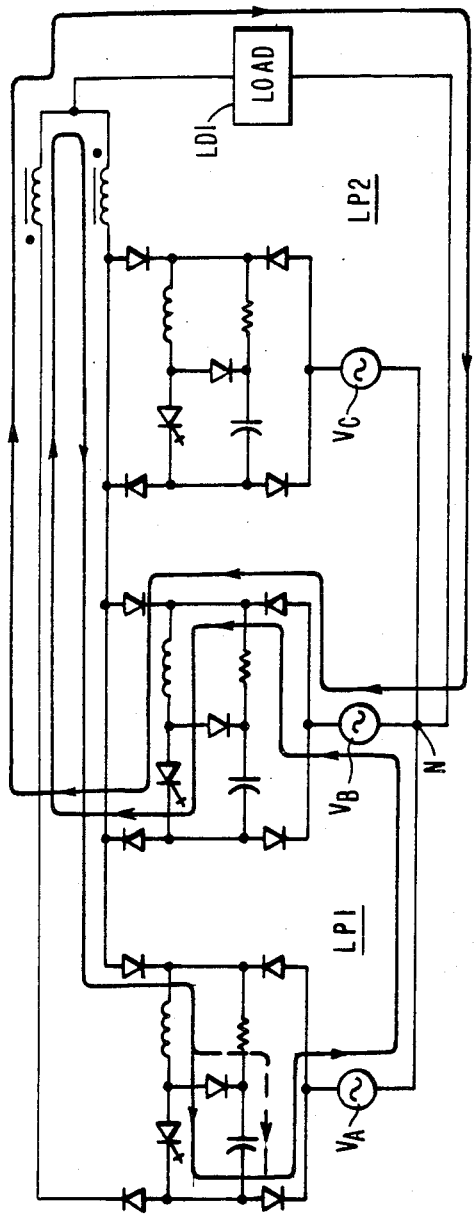
Figure 16C:
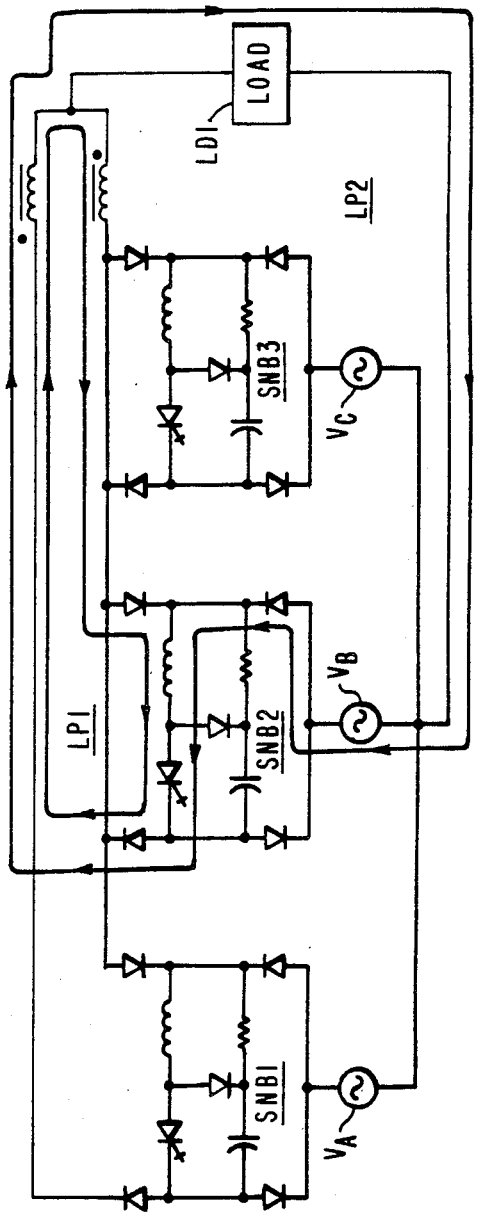

FIG. 15 shows the circuit of FIG. 13 with the provision of the inductances $L_{11}$, $L_{12}$ according to the present invention, like in the instance of FIG. 7. FIGS. 16A, 16B, 16C show three successive modes of operation corresponding to FIG. 15.

In mode #1 (FIG. 16A) load current flows normally through bilateral switch BSA1 and the load LD1. In mode #2, while load current flow has built up in loop LP2, which goes through inductance $L_{11}$, there is a circulating current in loop LP1 through both inductances $L_{11}$ and $L_{12}$ involving the two GTO's $T_1$ and $T_2$, one outgoing the other oncoming. It is observed that the snubber capacitor charging current (shown in dotted line after the upper switch $T_1$ has been turned-off) is limited by the inductor current, whereby the overcharging current voltage previously mentioned of the capacitor is reduced. During such charging period, the inductor is magnetized. There may be concern that such magnetization would grow and coexist as a function of the switching frequency. Its magnitude will be limited to a value when the incoming energy is balanced out by the dissipated energy of the switches. The diode recovery current would have a similar effect.

Another undesirable effect is to be considered, as would result if the turning ON of two switches happen to overlap during a finite duration. This is the case if the second switch is turned ON before the first has been turned OFF completely. This is the situation shown by mode #2 of FIG. 14B. In order to avoid this, a turn-OFF detection circuit is required for each individual switch. However, the addition of such turn-OFF detection circuits worsens the reliability of the system, besides increasing the cost. This problem is overcome thanks to the inductor's $L_{11}$, $L_{12}$ as shown in mode #2 of FIG. 16B. The price to be paid is the magnetizing current build-up as a function of time, which ceases to increase only at a relatively high level when the dissipation of energy by the switches has been balanced out by the charging energy.

In order to prevent such excessive magnetization of the inductors due to successive operation of the bilateral switches, provision is made, according to the invention, for demagnetization, which is a feature provided in addition to the energy dissipation by the switches.

Figure 17:
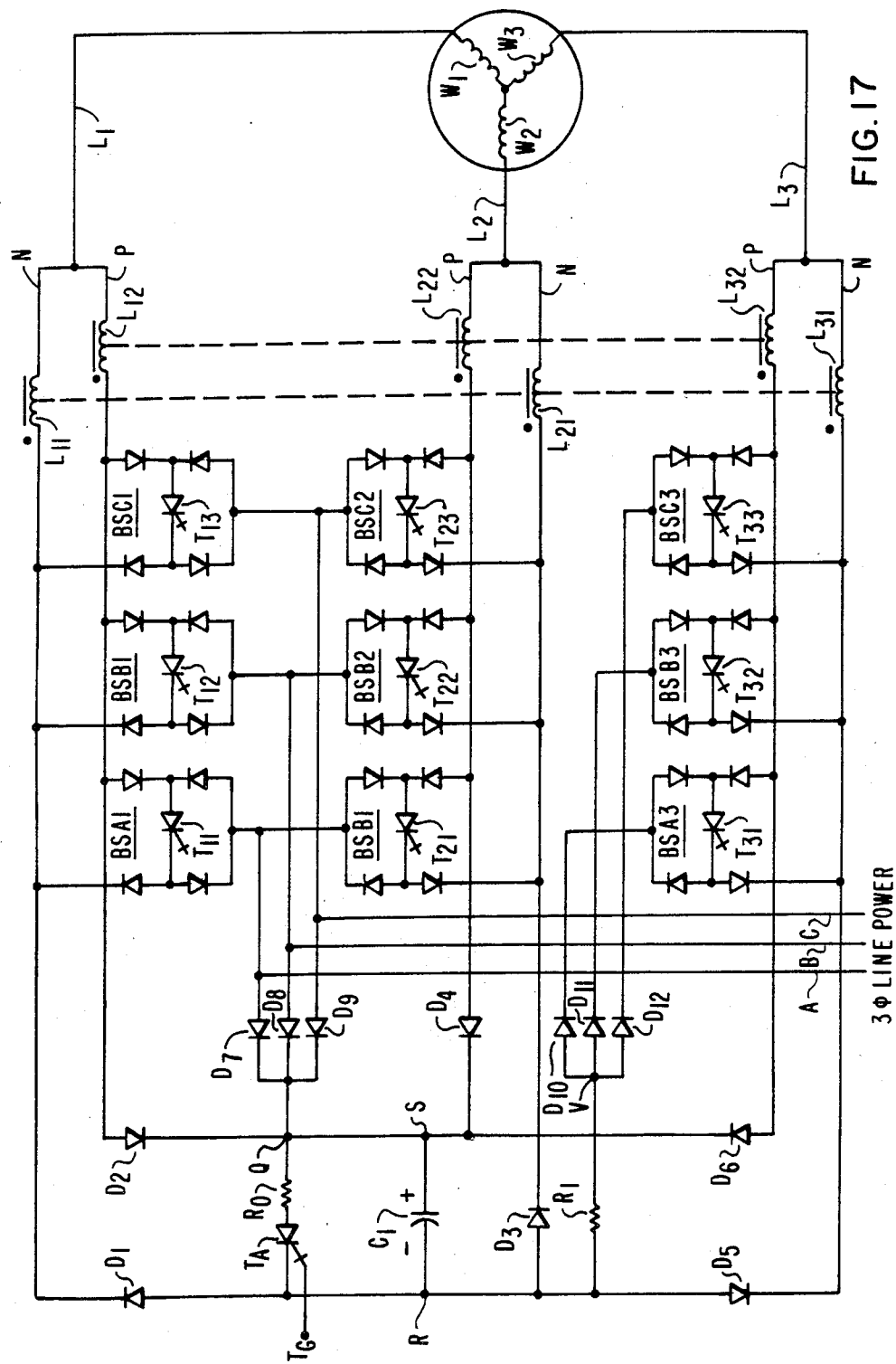
FIG. 17 is a circuit proposed for minimizing magnetization of the inductors according to the invention.

Referring to FIG. 17, such a demagnetization feature is illustrated. To this effect an auxiliary switch $T_A$, illustrated as a GTO device, is provided associated with an energy dissipating circuit, mounted in the diagonal of a diode bridge ($D_1$, $D_2$), for inductors $L_{11}$ and $L_{12}$, ($D_3$, $D_4$), for inductors $L_{22}$, $L_{21}$ and ($D_5$, $D_6$) for inductors $L_{32}$, $L_{31}$ which are the three pairs of inductors of a system otherwise like in FIG. 10. It appears that the load current freewheel through capacitor C1. Capacitor C1 is charged proportionally to the load current, to the switching frequency and to the OFF-time interval, called hereinafter a dead time. The magnitude of the line voltage is not accounted for, since it also contributes to the magnetization of the inductors.

The magnitude of the charging current will always be constant and equal to the peak value of the load current, provided it is ideally controlled during steady state operation.

Figure 18:
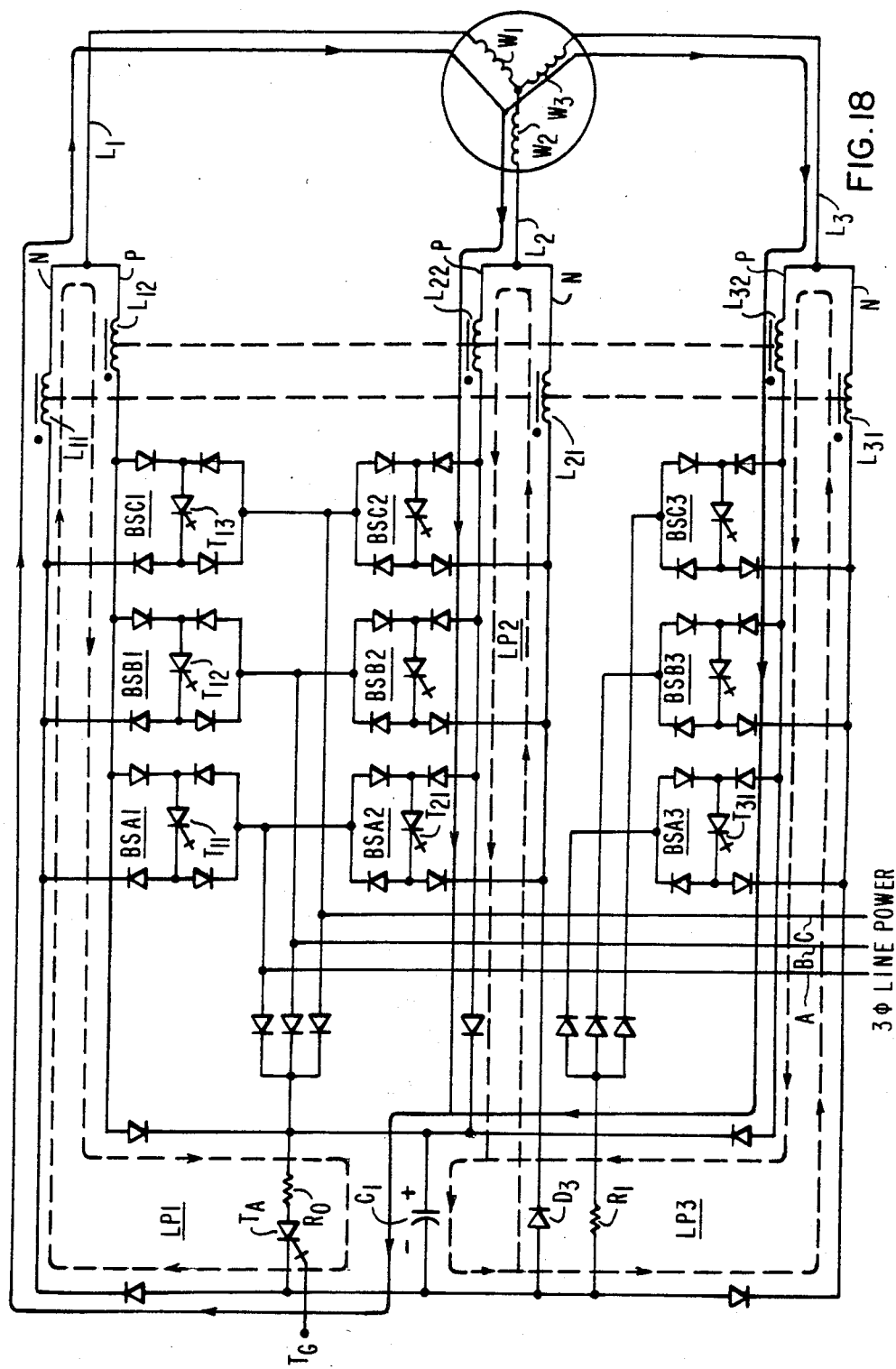
FIG. 18 illustrates with current flow the operation of the circuit of FIG. 17.

FIG. 18 shows the loops involved in the successive modes under commutation. The load currents are shown in solid line through the three windings $W_1$, $W_2$, $W_2$ which are star-connected. In dotted lines are the circulating currents of three loops LP1 for $L_{11}$, $L_{12}$, LP2 for $L_{22}$, $L_{21}$, and LP3 for $L_{32}$, $L_{31}$, in accordance with the direction of the load current. Loop LP1 involves diodes $D_1$, $D_2$; loop LP2 involves diodes $D_3$ and $D_4$; and loop LP3 involves diodes $D_6$ and $D_7$, all the loops involving capacitor C1. GTO device $T_A$ when triggered, in accordance with phases A, B or C via resistor $R_o$ and diode $D_7$, $D_8$ or $D_9$, respectively for one polarity, or via resistor $R_1$ and diode $D_{10}$, $D_{11}$, $D_{12}$ for the other polarity, will discharge capacitor $C_1$.

Demagnetization of the inductors occurs through loop LP1, LP2 or LP3 and the load currents freewheel through capacitor C1. The time interval for demagnetization of the inductors is usually short and less than the reverse recovery time of the involved switch. Therefore, the energy flowing into capacitor C1 will not be large and it can be dissipated by the auxiliary switch $T_A$ without significant losses to affect the efficiency of the system. The charging energy into capacitor C1 is proportional to the load current and depends upon the switching frequency and the duration of the OFF time interval.

If the OFF time interval between successive switchings is equal to, or longer than, the commutation time characteristic of the switch, magnetization of the inductors will not occur. If the OFF time interval is shorter, magnetization occurs. Therefore, the magnetizing currents of the inductors are controlled to a predetermined value such that the switches operate satisfactorily. Accordingly, turn-OFF detection circuits are no longer required.

Moreover, by choosing coupled inductors which are large enough, the magnetization and demagnetization effects will not develop too fast. In other words, there is time to adjust the magnetization of the inductors to such predetermined value by controlling the dead time between the switches via a proportional/integral (PI) closed control loop.

Accordingly, the improvement illustrated by the embodiment of FIG. 17 provides definite advantages:

Protection against shoot-through which could occur when passing from ON to OFF switching. This protection is obtained without the need for OFF-state detection means. Protection against line-to-line and load short is rendered more effective. Eight ring-around diodes are eliminated and a completely balanced system is obtained. The losses due to circulating currents through the switches are minimized.

Protection is obtained against the high dv/dt and the high surge voltage occurring on the OFF going switch as a result of the snubber capacitor and line leakage inductance.

It is observed that general purpose diodes can be used around the GTO switch, instead of high speed switching diodes. The size of the inductor can be reduced since the maximum magnetizing current is controlled.

What is claimed is:

1. In an Unrestricted Frequency Changer (UFC) system for converting AC power from AC input lines to AC output lines, the combination of:
    a plurality of diode bridges;
    each of said bridges being formed of two pairs of branches associated with respective ones of said input and output AC lines and including a power switch mounted in parallel to said pairs of branches and selectively controlled for operating with the associated diodes as a bilateral switch between input and output AC lines;
    a pair of inductors associated with at least two of said diode bridges;
    one inductor being connected to one diode of one branch in each of said two diode bridges;
    the other of said inductors being connected to the other diode of said one branch in each of said two diode bridges;
    said two inductors being further connected in common to one of said input and output AC lines;
    said one AC line being associated in common with said two bridges and said one branch thereof;
    the other branch of diodes in each bridge being connected to a corresponding AC line of the other of said input and output AC lines, as associated thereto;
    whereby upon the occurrence of a fault in said UFC system, said two inductors are limiting the rate of rise of the fault current while having a minimal effect on the operation of the UFC system under steady state conditions.

2. The system of claim 1 with three said diode bridges being associated with a common pair of inductors;
    said three diode bridges being connected to three separate AC lines and said common pair of inductors being connected to one corresponding AC line.

3. The system of claim 2 with three pairs of inductors being provided connected to respective ones of three AC lines;
    three groups of said three diode bridges being provided each connected, on one side to three respective ones of said one corresponding AC line, on the other side to one of said three pairs of inductors;
    one inductor in each pair of inductors being coupled to a corresponding one of the other pairs of inductors.

4. The system of claim 2 with six pairs of inductors being provided connected to six respective AC lines;
    with three pairs of three diode bridges being provided;
    each group of three diode bridges being connected to three respective AC lines and being connected through an associated one of said six pairs of inductors to a corresponding one of said six respective AC lines;
    one inductor in each of said six pairs of inductors being coupled to five inductors similarly situated in the five other said pairs of inductors.

5. The system of claim 2 with three pairs of inductors being provided connected to three respective AC lines;
    with three pairs of three diode bridges being provided each group of three diode bridges being connected to one of six respective AC lines;
    within each pair of three diode bridges said diode bridges being associated by pairs to the respective said three AC lines and three pairs of inductors.

6. The system of claim 5 with each inductor of a pair being connected to two opposite diode bridges of a pair of three diode bridges.

7. The system of claim 6 with the opposite diode bridges of a pair of three diode bridges of a pair of three diode bridges being associated with a common vertex of a polygonal connection of said respective AC lines.

8. The system of claim 7, with said three pairs of inductors being coupled to one another across different ones of said three respective AC lines.

9. The system of claim 1 with snubber means being mounted in each of said diode bridges with and associated with the corresponding power switch.

10. The system of claim 1 with controlled demagnetization means being provided operative with said pair of inductors.

* * * * *